United States Patent [19]

Beisch

[11] 4,232,907
[45] Nov. 11, 1980

[54] VEHICLE WHEEL WITH WHEEL COVER AND RETAINING CLIP

[75] Inventor: Hans R. Beisch, Amherstburg, Canada

[73] Assignee: Norris Industries, Inc., Ypsilanti, Mich.

[21] Appl. No.: 31,376

[22] Filed: Apr. 19, 1979

Related U.S. Application Data

[63] Continuation of Ser. No. 807,572, Jun. 17, 1977, abandoned.

[51] Int. Cl.³ .............................................. B60B 7/00
[52] U.S. Cl. ................................ 301/37 R; 301/37 P; 24/73 HC; 24/73 B
[58] Field of Search ................ 301/37 R, 37 P, 37 C, 301/37 CD, 37 B, 37 PB, 37 TP; 24/73 HC, 73 B, 73 R, 73 SC; 220/323; 292/343

[56] References Cited
U.S. PATENT DOCUMENTS

| | | | |
|---|---|---|---|
| 3,724,904 | 4/1973 | McCarroll | 301/37 R |
| 3,873,161 | 2/1975 | Kretschmer | 301/37 P |
| 3,970,346 | 7/1976 | Kretschmer | 301/37 R |

Primary Examiner—H. Grant Skaggs
Attorney, Agent, or Firm—Ellsworth R. Roston

[57] ABSTRACT

A wheel cover for covering at least a portion of the outer face of a wheel, including an inner face of the wheel cover including a plurality of recesses and with the inner face of the wheel cover disposed adjacent an outer face of the wheel when the wheel cover is fastened in position, each recess including a plurality of oppositely disposed spaced wall portions, a spring clip having a pair of leg portions positioned within each recess and with each leg portion disposed against a wall portion, each spring clip normally having a spacing between the leg portions greater than the spacing between the wall portions of each recess and with each spring clip when positioned within each recess preloaded by the restraint of the wall portions, and each spring clip additionally including an extension of one of the leg portions extending without the recess for providing engagement with a portion of the wheel and providing additional loading of the spring clip for fastening the wheel cover to the wheel.

40 Claims, 10 Drawing Figures

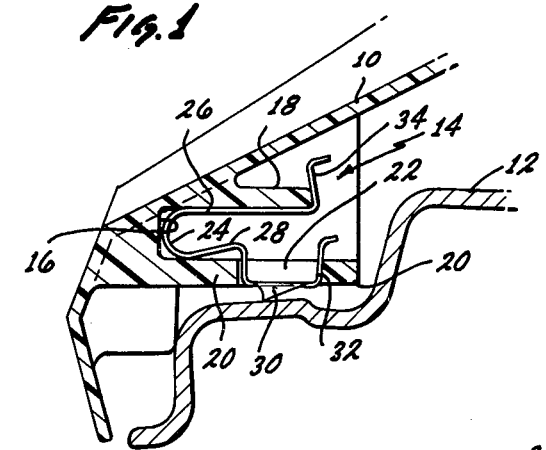
Fig.1
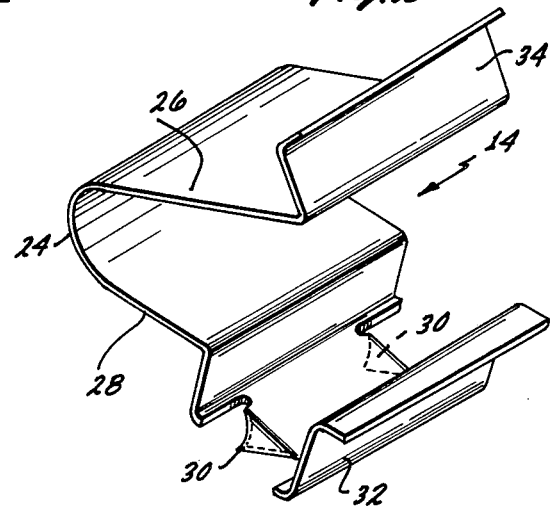
Fig.2
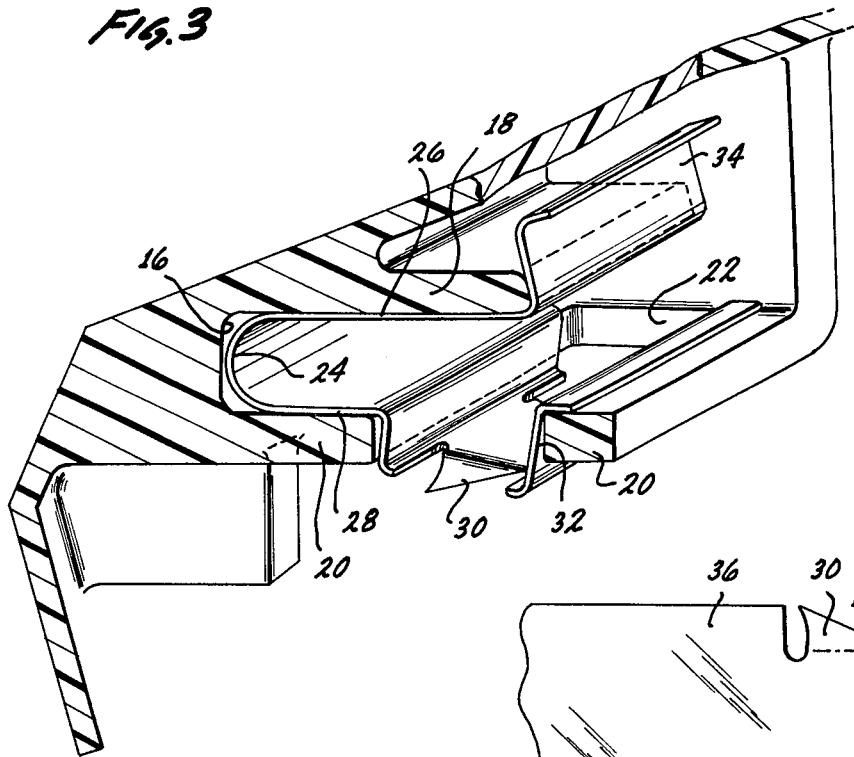
Fig.3
Fig.4
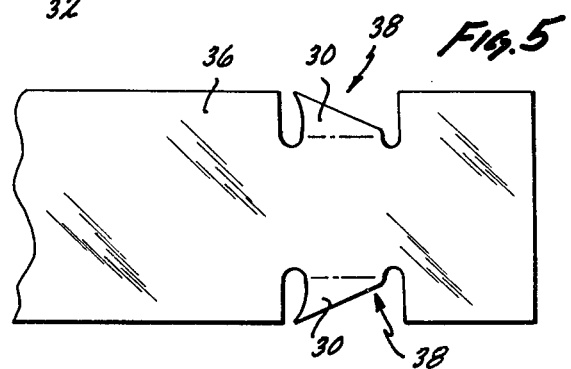
Fig.5

VEHICLE WHEEL WITH WHEEL COVER AND RETAINING CLIP

This is a continuation, of application Ser. No. 807,572, filed June 17, 1977 and now abandoned.

The present invention is directed to vehicle wheels including wheel covers and to resilient fastening clips disposed in recesses of the wheel cover and used to fasten the wheel cover to the vehicle wheel.

It is known in the prior to use such resilient or spring clips for securing a wheel cover to the vehicle's wheel. For example, an increasing number of wheel covers are now being manufactured out of plastic and these plastic wheel covers must be retained on the metallic wheel. Since the wheel cover and wheel may be subjected to extreme temperature conditions, it is necessary to retain the wheel cover on the wheel throughout these extreme temperature conditions. For example, since the coefficients of expansion between the metal wheel and the plastic wheel cover are different, it is necessary to use a spring clip which will maintain the wheel cover on the wheel even over these extreme temperature conditions. It is also to be appreciated that the wheel cover and wheel may be subjected to various types of forces during operation of the vehicle and it is necessary to retain the wheel cover on the wheel throughout these various types of forces.

One type of prior art device does use a resilient fastening clip disposed in a recess or pocket in the wheel cover. The prior art clip has a free leg member extending outward and with the leg member forced inward from a completely unbiased position to a restrained position and with the outward force provided by the clip in the restrained position used to retain the wheel cover to the wheel. A number of such clips are disposed circumferentially around the wheel cover to fasten the wheel cover to the wheel and to maintain the wheel cover in position during the changing temperature conditions and during the various forces of rotation and shock to which the wheel and wheel cover are subjected during movement by the vehicle.

The prior art type of spring clips which provide for movement of the leg member from an unbiased position have a fairly large stroke for the leg member from the position when the wheel cover is off the wheel to the position when the wheel cover is attached to the wheel. The large stroke for the leg member is used so as to provide for a sufficient force to attach the wheel cover to the wheel and with this sufficient force being present during the changing temperature conditions and different force conditions on the wheel and wheel cover.

The prior art device as described above does present a number of problems. For example, the use of this long stroke for the leg member makes the installation of the wheel cover on the wheel difficult since the leg members of all of the clips must be moved through this long stroke before the wheel cover is attached to the wheel. In addition, the use of an unbiased leg member for the spring clip increases the space necessary between the wheel and the inside of the wheel cover to allow for the stroke of the leg member during fastening of the wheel cover to the wheel.

The present invention is directed to an improved wheel and wheel cover with a resilient retaining clip which uses a hairpin type spring clip having one leg of the clip preloaded to significantly reduce the stroke necessary during the attachment of the wheel cover to the wheel. Specifically, the present invention provides for the wheel cover including a plurality of recesses or pockets each having a pair of oppositely disposed spaced walls and with the leg portions of the spring clip disposed between the spaced walls and restrained by the walls to bias the spring clip to a preloaded condition. An extension of one of the preloaded leg portions which may, for example, include a barbed portion extends from the recess so as to engage a portion of the wheel to attach the wheel cover to the wheel. Since the clips have been preloaded the leg portion requires a relatively short stroke during installation of the wheel cover on the wheel but the clip provides a sufficient force so as to retain the wheel cover on the wheel during changes in temperature conditions and during various forces applied to the wheel and wheel cover.

The present invention has a number of advantages over the prior art. Specifically, the present invention provides for an ease of insertion of the retaining clip into the recesses in the wheel cover. The construction of the clips and wheel cover is relatively inexpensive, yet provides for a secure attachment of the wheel cover to the wheel. The retaining clip has a positive tooth position to grip the wheel even in the released position where the wheel cover is out of engagement with the wheel. In addition, the insertion of the wheel cover against the wheel is simpler because the stroke of the leg portions of the spring clips is significantly reduced.

A clearer understanding of the invention will be had with reference to the following description and drawings wherein FIG. 1 illustrates a first embodiment of the invention showing a wheel and a wheel cover and with a spring clip located within a recess in the wheel cover for securing the wheel cover to the wheel;

FIG. 2 illustrates a perspective view of the spring clip of the first embodiment of FIG. 1;

FIG. 3 illustrates the spring clip of the first embodiment of the invention in a depressed position for insertion in the wheel cover;

FIG. 4 illustrates the spring clip of the first embodiment of the invention inserted within the recess in the wheel cover and prior to the attachment of the wheel cover to the wheel;

FIG. 5 illustrates a portion of the spring clip of the first embodiment of the invention;

Figure 6:
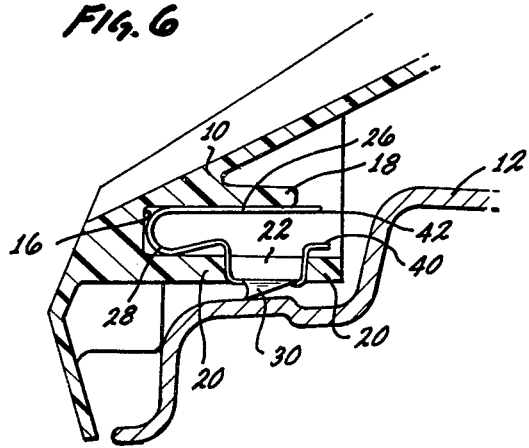
FIG. 6 illustrates an alternative end portion for the spring clip of the first embodiment of the invention.

In FIG. 1, a wheel cover 10 is shown positioned within a wheel 12. The wheel 12 supports a tire (not shown) and the wheel 12 is constructed of a strong metallic material. The wheel cover 10 may be constructed of a plastic material so as to reduce the weight of the wheel cover 10.

A spring clip 14 is shown positioned within a recess 16 in the wheel cover 10 and a plurality of such spring clips 14 are positioned circumferentially around the wheel cover 10 in a complementary plurality of recesses 16.

Each recess 16 includes a pair of wall members 18 and 20 to support the spring clip 14 and to preload the spring clip by restraining the outward movement of the legs of the spring clip 14. The wall member 20 includes an opening 22 to pass a portion of the spring clip 14 for engagement with the wheel 12. In addition, the opening 22 provides for a stop to lock the spring clip 14 in position within the recess 16. The opening 22 constitutes an interruption defined by the wall member 20.

As more clearly shown in FIG. 2, the spring clip 14 includes a radiused section 24 from which extends a pair of leg portions 26 and 28. Barbed members 30, which are bent downward from the leg portions 26 and 28, engage the wheel 12 as shown in FIG. 1 when the cover 10 is positioned against the wheel 12. A flanged portion 32 of the leg 28 is used in conjunction with the opening 22, as shown in FIG. 1, to lock the clip in position within the pocket 16. A flanged portion 34 of the leg 26 is positioned against the end of the wall 18, as shown in FIG. 1, and the flanged portions 32 and 34 may be used to aid in the insertion of the clip 14 within the recess 16. This may be seen in more detail in FIG. 3. The end of the wall 18 may be considered to constitute an interruption defined by the wall.

In FIG. 3 the spring clip 14 is shown in its depressed position for insertion within the recess 16. Specifically, the flanged portions 32 and 34 may be squeezed together, for example, by a pair of pliers so that the clip 14 may be inserted between the walls 18 and 22 and pushed inward until the clip 14 is locked within the recess 16 as shown in FIG. 4. Specifically, as shown in FIG. 4, the spring clip is biased to a preloaded condition because the leg portions 26 and 28 are prevented for outward movement by the walls 18 and 20 of the recess 16 of the wheel cover 10. The opening 22 in cooperation with the portion 32 of the spring clip 14 locks the spring clip within the recess 16 and prevents the spring clip from coming out of the recess 16 during attachment of the wheel cover 10 to the wheel 12 and subsequent removal of the wheel cover from the wheel.

As can be seen in FIG. 2, the legs 26 and 28 of the spring clip 14 are normally sprung open so that the legs 26 and 28 are not parallel to each other, but diverge away from each other from the radiused portion 24. The spring clip 14 may be depressed as shown in FIG. 3 and inserted within the recess 16 and with the spring clip 14 restrained to the preloaded condition as shown in FIG. 4. In FIG. 4, the legs 26 and 28 are restrained to be substantially parallel to each other by the wall portions 18 and 20 of the recess 16 of the wheel cover 10.

When the wheel cover 10 is pushed against the wheel 12, the barbed portions 30 engage a portion of the wheel 12 and additionally force the legs of the spring clip 14 toward each other. Since the spring clip 14 has already been preloaded to provide an outward force, the further movement of the spring clip 14 during attachment of the wheel cover 10 to the wheel 12 may be greatly reduced in comparison to a spring clip where the legs have not been preloaded. However, because of the preloading, the spring clip 14 may still provide for a substantial outward force to maintain the wheel cover 10 in attachment with the wheel 12 even with extreme temperature changes or with forces transmitted to the wheel and wheel cover during vehicle movement.

As indicated above, a plurality of recesses 16 are used with a plurality of spring clips so that a plurality of barbed portions 30 can engage the wheel 12 at circumferentially positions around the wheel. The barbed portions 30 may be formed as shown in FIG. 5 which illustrates a portion of the spring clip 14 prior to bending the spring clip into the form as shown in FIG. 2. The spring clip 14 may be formed of a single straight piece of metal 36 which is cut out at positions 38 to form the barbed portions 30 and the cutout is within the outer edge of the metal 36. The barbed portions 30 are then bent down at a right angle as shown in FIG. 2.

FIG. 6 illustrates a modification of the first embodiment of the spring clip including end portions 40 and 42 replacing the end portions 32 and 34 as shown in FIG. 2. The configuration of the end portions as shown in FIG. 6 may facilitate the insertion of the spring clip within the recess 16. It is also to be appreciated that the end portions 40 and 42 may be eliminated completely since the preloading of the spring clip is provided essentially by the wall members 18 and 20 which prevent the legs 26 and 28 from springing outward to the unbiased position shown in FIG. 2.

Figure 7:
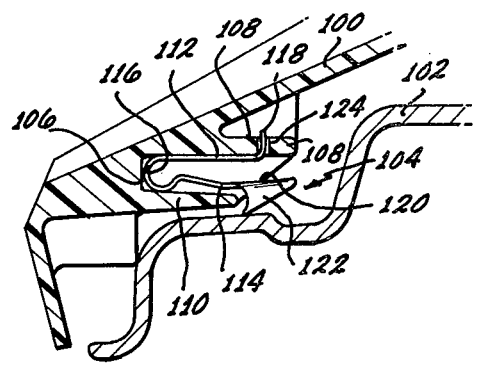
FIG. 7 illustrates a second embodiment of the invention showing a wheel and a wheel cover and with a spring clip positioned within a recess in the wheel cover and with the wheel cover attached to the wheel.

FIG. 7 illustrates a second embodiment of the invention including a wheel cover 100 attached to a wheel 102 and with the second embodiment using a different form of a spring clip 104 and a different configuration for a recess 106. The clip 104 is again positioned within the recess 106 of the wheel cover 100. It is to be appreciated that a plurality of such recesses 106 and spring clips 104 are used to provide for the attachment of the wheel cover 100 to the wheel 102. As with the first embodiment of the invention, the recess 106 includes a pair of wall portions 108 and 110 which support the clip 104 in a biased and preloaded condition.

Figure 8:
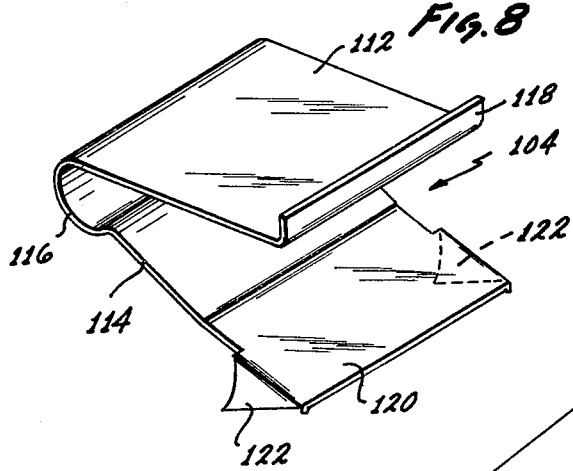
FIG. 8 illustrates a perspective view of the spring clip of the second embodiment of the invention.

As shown in FIG. 8, the clip 104 includes a pair of leg members 112 and 114 which extend outwardly from a radiused section 116. A flanged portion 118 extends from the leg 112. A flat section 120 including barbed portions 122 extends from the leg portion 114. FIG. 8 illustrates the clip 104 in its open and unbiased position. FIG. 7 illustrates the clip with the barbed portions 122 engaging a portion of the wheel 102 so as to provide for the attachment of the wheel cover 100 to the wheel 102.

Figure 9:
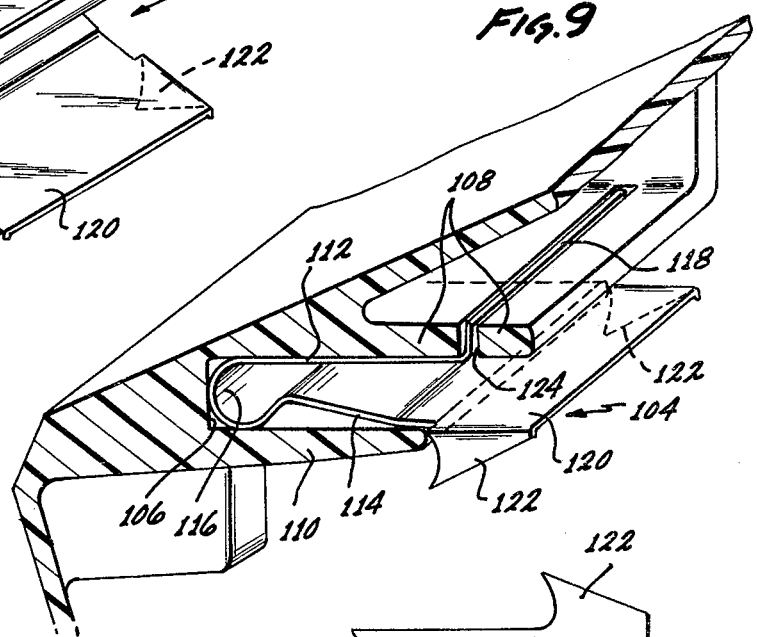
FIG. 9 illustrates the spring clip of the second embodiment of the invention positioned within the recess in the wheel cover and prior to the attachment of the wheel cover to the wheel.

FIG. 9 illustrates the clip 104 in a biased and preloaded condition wherein the legs 112 and 114 are preloaded by the walls 108 and 110 of the recess 106. Specifically, the end of the wall 110 engages the inner portion of the flat section 120 which extends from the leg 114. The flanged portion 118 is positioned within an opening 124 in the wall 108. The opening 124 in the wall 108 may be considered to constitute an interruption defined by the wall. The positioning of the portion 118 in the opening 124 locks the spring clip 104 within the recess 106.

Figure 10:
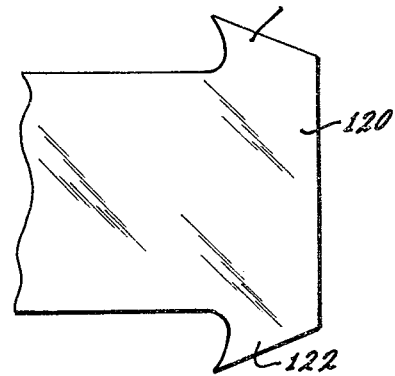
FIG. 10 illustrates a portion of the spring clip of the second embodiment of the invention.

As shown in FIG. 10, the barbed portions 122 may be formed from the flat section 120 and are without the outer edge of the flat section. The barbs are then folded downward to the position as shown in FIG. 8. During the attachment of the wheel cover 100 against the wheel 102, the barbed portions 122 engage a portion of the wheel 102 and flex the leg 114 toward the leg 112 and with the preloading of the legs 112 and 114 additionally providing for a force to urge the barbs 122 into the wheel 102.

As can be seen with the various embodiments of the invention disclosed in the present application, the wheel cover and spring clip of the present invention includes a preloading of the legs of the spring clip by restraining the legs of the spring clip from outward movement by wall portions of a recess in the wheel cover. In this way, the insertion and attachment of the wheel cover to the wheel is facilitated since the spring clips do not have to be moved through as great a stroke angle as would be necessary if the legs of the clip were not preloaded. However, the preloading plus the additional loading produced when the wheel cover is attached to the wheel provides for sufficient force so that the clip engages the wheel and provides for this engagement during extreme temperature conditions and during various forces produced on the wheel and wheel cover.

It can be seen, therefore, that the present invention provides for a vehicle wheel including a wheel cover and with a spring clip for attachment of the wheel cover to the wheel and with the construction being simple to manufacture and inexpensive in cost. The invention provides for proper attachment of the wheel cover to the wheel under extreme conditions while still permitting an ease in the installation of the wheel cover to the wheel.

Although the invention has been described with reference to various embodiments, it is to be appreciated that various adaptations and modifications may be made and the invention is only to be limited by the appended claims.

I claim:

1. In combination for covering at least a portion of the outer face of a wheel, including,
    a wheel cover including a plurality of recesses,
    each recess being defined by at least a pair of oppositely disposed spaced wall portions on the wheel cover, each of the wall portions defining an interruption,
    a plurality of spring clips each having a pair of resilient leg portions positioned within an individual one of the recesses and disposed against individual ones of the wall portions of such individual recess,
    each spring clip normally having a spacing between the resilient leg portions greater than the spacing between the wall portions of each recess and the resilient leg portions of each spring clip, when positioned within each recess, being preloaded by the restraint of the wall portions, and
    each spring clip additionally including a first flanged extension of a particular one of the leg portions outside of the associated recess, at a position engaging the interruption defined by a particular wall portion, to be constrained by the interruption,
    the flanged extension providing an engagement with the wheel and a fastening of the wheel cover to the wheel, and
    each spring clip additionally including a second flange at a position engaging the interruption in the other wall portion.

2. The combination of claim 1 wherein
    the flanged extension of the particular one of the leg portions includes a barbed portion for engaging the wheel.

3. The combination of claim 2 wherein
    a particular one of the leg portions is provided with a cut-out section and the barbed portion is formed by folding the cut-out section of the particular leg portion.

4. The wheel cover of claim 3 wherein
    the cut-out section is near the outer edge of the particular leg portion.

5. The combination of claim 3 wherein
    the wall portion disposed against the particular leg portion of each spring clip defines the interruption and the interruption is an opening and the cut-out section of the particular leg portion is disposed outside of the opening.

6. The combination of claim 1 wherein
    the leg portions in each clip respectively engage the wall portions defining the recess receiving the clip to lock the spring clip within the recess.

7. The combination of claim 6 wherein
    the flanged extension of the particular one of the leg portions is formed as a flange and the particular one of the wall portions defines the interruption and the interruption is an opening to receive the flange.

8. The combination of claim 7 wherein
    the leg portion including the flanged extension providing engagement with the wheel includes the flange and wherein the opening defined by the wall portion receives the flange and wherein the flange has at its end a barb engaging the wheel.

9. The combination of claim 6 wherein
    the leg portion other than the one providing engagement with the wheel includes a flange section at the end of this leg portion and the wall portion other than the particular wall portion defines an interruption and the interruption is an opening and the flange section extends through the opening.

10. In combination,
    a vehicle wheel having an outer face including a receiving portion,
    a wheel cover including an inner face and including a plurality of recesses in the inner face, the inner face of the wheel cover being disposed adjacent the outer face of the wheel when the wheel cover is fastened in position to the wheel,
    each recess being formed by at least a pair of oppositely disposed spaced wall portions each defining at least one interruption,
    a spring clip having a pair of resilient leg portions positioned within each recess and disposed against the wall portions forming the recess,
    each spring clip normally having a spacing between the leg portions greater than the spacing between the wall portions of each recess and the resilient leg portions of each spring clip, when positioned within each recess, being preloaded by the restraint of the wall portions,
    a particular one of the leg portions in each clip being disposed in a particular direction corresponding substantially to that of an abutting wall portion in the recess,
    each spring clip additionally including an extension of the particular one of the leg portions outside of the recess, the extension being disposed in engagement with the interruption defined by the wall portion and in engagement with the wheel at a position adjacent to the recess and fastening the wheel cover to the wheel at the position adjacent to the recess, the extension being defined at its opposite ends substantially by a continuation of a line defining the disposition of the particular leg portion in the particular direction.

11. The vehicle wheel of claim 10 wherein
    the extension of the particular one of the leg portions includes a barbed portion engaging the wheel at the position adjacent to the recess.

12. The vehicle wheel of claim 11 wherein
the particular leg portion is provided with a cut-out section near the end of the leg portion and the barbed portion is formed by folding the cut-out section of the leg portion.

13. The vehicle wheel of claim 12 wherein
the wall portion disposed against the particular leg portion defines the interruption and the interruption is an opening and the cut-out section is disposed outside of the opening defined by such wall portion.

14. The vehicle wheel of claim 12 wherein
the barbed portion defined by the cut-out section extends beyond the opening and engages the wheel.

15. The vehicle wheel of claim 10 wherein
a particular section near the end of one of the leg portions is disposed in an opening defined by the associated one of the wall portions to lock the spring clip within the recess.

16. The vehicle wheel of claim 15 wherein
the particular section is formed as a flange and the opening in the associated one of the wall portions receives the flange.

17. The vehicle of claim 16 wherein
the leg portion other than the one providing for engagement with the wheel includes a flange.

18. The vehicle wheel of claim 16 wherein
the leg portion including the extension providing engagement with the wheel includes the flange section and wherein the wall portion defines the interruption and the interruption is an opening and the opening receives the flange and the flange defines the extension providing engagement with the wheel.

19. A spring clip for fastening to a wheel a wheel cover which includes a recess for receiving the spring clip and wherein the recess is defined in the wheel cover by a pair of oppositely disposed spaced wall portions having a particular spacing, the spring clip including
a radiused portion and a pair of resilient leg portions having a greater spacing than the particular spacing and extending from opposite ends of the radiused portion for positioning within the recess against the wall portions, each of the resilient leg portions in the pair extending in a particular direction,
a flanged portion extending from a particular one of the leg portions at a position near the end of the particular one of the leg portions opposite the radiused portion and extending initially in a direction transverse to the particular direction and then in a direction substantially parallel to the particular direction and terminating at a position defining a continuation of the particular direction, and
an extension extending from the portion of the flanged portion substantially parallel to the particular one of the leg portions and in a direction transverse to the particular leg portion to a position outside of the recess when the spring clip is positioned within the recess, the extension being disposed to engage the wheel for fastening the wheel cover to the wheel.

20. The spring clip of claim 19 wherein
the extension of the flanged portion on the particular one of the leg portions includes a barbed portion for engaging the wheel, the barbed portion being disposed on the portion of the flanged portion extending in the direction substantially parallel to the particular direction.

21. The spring clip of claim 20 wherein
the particular one of the leg portions is formed with a cut-down section at the position of the flanged portion and the barbed portion is formed by folding the cut-out section of the leg portion.

22. The spring clip of claim 21 wherein
the end of the other leg portion opposite to the radiused portion extends from the recess in a direction away from the wheel cover to avoid any gouging of the wheel cover.

23. The spring clip of claim 21 wherein
the flanged portion constitutes a continuation of the particular one of the leg portions.

24. The spring clip of claim 19 for fastening to a wheel cover having an opening in one of the wall portions wherein
one of the leg portions includes a portion extending through the opening for locking the spring clip within the recess.

25. The spring clip of claim 24 wherein
the flanged portion in the particular one of the leg portions extends through the opening in the wall portion.

26. The spring clip of claim 25 for fastening to a wheel cover having the opening defined by at least one interruption in the particular wall portion and wherein
the particular leg portion is the one providing for engagement with the wheel and the flanged portion engages the interruption and wherein a barbed portion is provided at the end of the flanged portion for providing for engagement with the wheel.

27. The spring clip of claim 24 wherein
a portion extends through the opening and such portion is included in the leg portion other than the particular leg portion.

28. In combination for engagement with a wheel,
a spring clip having a pair of resilient leg portions normally spaced from each other by a particular distance and having a radiused section joining the pair of resilient leg portions and having a flanged portion on a particular one of the leg portions near the end of the particular leg portion opposite the radiused section, the flanged portion being constructed to engage the wheel, and
a wheel cover having a recess defined by a first wall and a pair of walls extending from the first wall and spaced from each other by a distance less than the normal spacing between the leg portions, each of the walls defining an interruption, the leg portions being disposed in the recess against the walls with the radiused section disposed against the first wall, the flanged portion on the particular one of the leg portions being disposed in the interruption defined by one of the walls and being disposed against such interruption and extending beyond such wall to engage the wheel,
the end of the other one of the leg portions being disposed relative to the wheel cover to be constrained by the interruption defined by the other wall and extending in a direction avoiding any gouging of the wheel cover.

29. The combination set forth in claim 28 wherein
the other one of the leg portions extends in a direction away from the wheel cover near the end of such other one of the leg portions to assure that the other one of the leg portions avoids any gouging of the wheel cover.

30. The combination set forth in claim 28 wherein the wall portion adjacent the particular one of the leg portions defines an interruption at a particular position and the flanged portion of the particular one of the leg portions includes a flange extending over the portion of the wall defining the interruption.

31. The combination set forth in claim 30 wherein a barbed portion is disposed on the flanged portion seated in the interruption defined by the particular wall portion and wherein the barbed portion extends beyond the particular wall portion to engage the wheel.

32. The combination set forth in claim 31 wherein the interruption in the particular wall portion constitutes an opening and the flanged portion engages the walls defining such opening defined by the particular wall portion.

33. The combination set forth in claim 31 wherein the other one of the wall portions defines an against such interruption and the end of the other one of the leg portions is bent to extend into such opening.

34. The combination set forth in claim 30 wherein the end of the other one of the leg portions is bent to engage the wall defining the interruption in the other one of the wall portions.

35. In combination for engagement with a wheel,
a wheel cover having first and second wall portions extending from the wheel cover in spaced relationship to each other to define a recess, the first and second portions defining interruptions,
a spring clip having first and second resilient leg portions spaced from each other in a free relationship by a distance greater than the spacing between the first and second wall portions and disposed in the recess in constrained relationship,
means extending from the first leg portion against the interruption defined by the first wall portion for engagement with the wheel, and
the second leg portion being disposed relative to the wheel cover to be constrained by the interruption defined by the second wall portion and extending in a direction avoiding any gouging of the wheel cover.

36. The combination set forth in claim 35 wherein the first wall portion defines an interruption at a particular position and the engaging means in the first leg portion extends into and beyond such interruption, in abutting relationship with such interruption, to engage the wheel.

37. The combination set forth in claim 36 wherein the engaging means on the first leg portion includes a flanged portion extending against the interruption in the first wall portion and includes a barbed portion extending from the flanged portion to a position beyond the interruption to engage the wheel.

38. The combination set forth in claim 37 wherein the end of the other one of the leg portions is bent to extend along and abut the interruption defined by the second wall portion.

39. The combination set forth in claim 38 wherein the end of the second leg portion extends against such interruption.

40. The combination set forth in claim 38 wherein the interruption defined by the first wall portion constraining the first leg portion is an opening and the flanged portion is constrained against the walls defining such opening and the barbed portion extends beyond such opening, on the opposite side of the opening from the particular leg portion, to engage the wheel.

* * * * *